C. A. GEORGE.
NUT LOCK.
APPLICATION FILED APR. 3, 1909.
929,084.
Patented July 27, 1909.
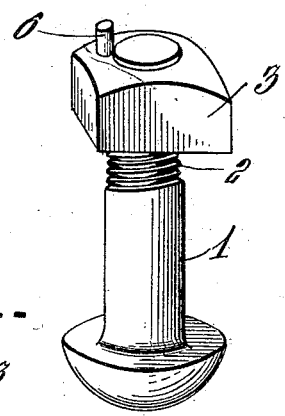
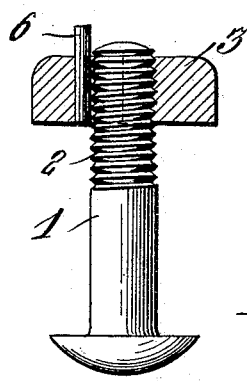
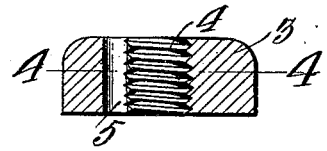
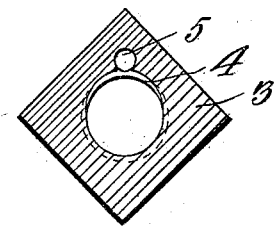
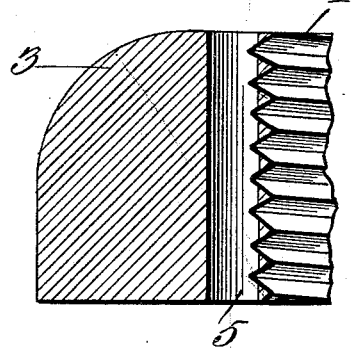
Witnesses
Morris Lessin
E. M. Ricketts
Inventor
Charles A. George
By Watson E. Coleman
Attorney

UNITED STATES PATENT OFFICE.

CHARLES A. GEORGE, OF ALMOND, WISCONSIN.

NUT-LOCK.

No. 929,084.　　　Specification of Letters Patent.　　　Patented July 27, 1909.

Application filed April 3, 1909. Serial No. 487,723.

*To all whom it may concern:*

Be it known that I, CHARLES A. GEORGE, a citizen of the United States, residing at Almond, in the county of Portage and State of Wisconsin, have invented certain new and useful Improvements in Nut-Locks, of which the following is a specification, reference being had to the accompanying drawings.

This invention relates to improvements in nut-locks of that class in which nuts are locked to their bolts by longitudinal keys.

The object of the invention is to provide a simple, effective and inexpensive nut-lock of this character in which an ordinary bolt and an ordinary nut are used with a slight modification of the nut and the addition of a locking pin or key.

With the above and other objects in view, the invention consists of the novel features of construction and the combination and arrangement of parts hereinafter fully described and claimed, and illustrated in the accompanying drawings, in which—

Figure 1 is a perspective view of the improved nut-lock; Fig. 2 is a section through the same; Fig. 3 is a detail section through the nut; Fig. 4 is a section through the nut taken on a plane at right angles to that of Fig. 3, the plane being indicated by the line 4—4 in Fig. 3; and Fig. 5 is an enlarged detail section showing the manner in which the pin or key receiving opening is formed in the nut.

In the drawings 1 denotes a bolt, tie rod or the like having external screw threads 2 of the usual V-shape.

3 denotes a nut of any desired size and shape having a central opening or bore 4 screw threaded to engage the threads 2.

In the practice of my invention, I provide in the nut 3 an opening or orifice 5 which extends parallel or substantially parallel with the threaded bore or opening 4 and which partially intersects the screw threads in the nut, as shown more clearly in Fig. 5. By arranging the opening 5 in this manner, it will be seen that when the nut is screwed upon the bolt the outer edges of the threads 2 of the bolt will project slightly into the opening 5 in the nut. The nut is locked to the bolt by driving a steel or other hard metal key 6 down into the opening, orifice or socket 5 so that it will mutilate the edges of the bolt threads 2 that project into said opening 5. The latter is preferably of cylindrical shape and the locking key 6 is also preferably in the form of a cylindrical pin. By making said pin of greater length than the thickness of the nut, its ends will project beyond the outer face of the nut after the pin has been driven home, so that said projecting end may be engaged by a pair of pincers or other tool when it is desired to remove the pin to unlock the nut.

From the foregoing it will be seen that the invention is exceedingly simple so that it may be produced at a small cost. The only expense will be the provision of the locking pin 6 and the making of the opening 5 in the nut. The invention not only causes the nut to be effectively locked to the bolt so that it cannot work loose but permits it to be repeatedly relocked at different points on the bolt.

Having thus described the invention what is claimed is:

The hereindescribed nut-lock comprising, in combination, with a bolt, of a nut having the usual threaded opening for the reception of the bolt and the supplemental opening 5 extending entirely through the nut and disposed substantially parallel with the threaded opening, said opening 5 having a portion of its wall partially intersecting the screw threads of the bolt opening of the nut, whereby the edges of the threads of said bolt will project into the opening 5, and a hard metal locking pin driven into said opening 5 to mutilate the projection portions of the threads of the bolt and thereby lock the nut and bolt together, the outer end of said pin projecting beyond the outer face of the nut to permit it to be readily grasped by an extracting tool.

In testimony whereof I hereunto affix my signature in the presence of two witnesses.

CHARLES A. GEORGE.

Witnesses:
C. E. WEBSTER,
M. F. WEBSTER.